(12) United States Patent
Corso et al.

(10) Patent No.: US 12,241,627 B2
(45) Date of Patent: Mar. 4, 2025

(54) HOPPER CLEANOUT AND PELLET HANDLING MECHANISM

(71) Applicant: W.C. BRADLEY CO., Columbus, GA (US)

(72) Inventors: Dan Corso, Columbus, GA (US); Brad Gillespie, Midland, GA (US); Anthony Hamilton, Hamilton, GA (US); Ramin Khosravi Rahmani, Columbus, GA (US); Sleiman Abdallah, Columbus, GA (US); Michael Parsons, Auburn, AL (US)

(73) Assignee: W.C. Bradley Co., Columbus, GA (US)

( * ) Notice: Subject to any disclaimer, the term of this patent is extended or adjusted under 35 U.S.C. 154(b) by 1144 days.

(21) Appl. No.: 16/863,788

(22) Filed: Apr. 30, 2020

(65) Prior Publication Data

US 2021/0341144 A1 Nov. 4, 2021

(51) Int. Cl.
*F23K 3/14* (2006.01)
*A47J 37/07* (2006.01)

(52) U.S. Cl.
CPC ............. *F23K 3/14* (2013.01); *A47J 37/0704* (2013.01); *A47J 37/0786* (2013.01); *F23K 2203/202* (2013.01)

(58) Field of Classification Search
CPC ................................ F23K 3/14; F23K 2203/22
See application file for complete search history.

(56) References Cited

U.S. PATENT DOCUMENTS

| 2,068,018 | A | * | 1/1937 | Goetz | F23K 3/14 110/286 |
|---|---|---|---|---|---|
| 2,910,930 | A | | 11/1959 | Hankoff | |
| 3,017,954 | A | | 1/1962 | Kruckewitt | |
| 3,606,066 | A | | 9/1971 | Anderson | |
| 3,623,422 | A | | 11/1971 | Marshall | |

(Continued)

FOREIGN PATENT DOCUMENTS

| AT | 402850 B | 9/1997 |
|---|---|---|
| CN | 103989414 B | 5/2016 |

(Continued)

OTHER PUBLICATIONS

Rider 900 Pellet Grill, Oklahoma Joes [online] [site capture dated May 16, 2020]. Retrieved Apr. 17, 2024. Retrieved from: archive. org <https://web.archive.org/web/20200516122156/https://www.oklahomajoes.com/rider-900-pellet-grill> (Year: 2020).*

(Continued)

*Primary Examiner* — Jonathan Snelting
(74) *Attorney, Agent, or Firm* — GableGotwals; David G. Woodral

(57) ABSTRACT

A system having a hopper that receives fuel pellets and direct the pellets under gravity feed to an auger that moves the pellets into a firepot inside a cooking chamber of a grill. The system includes a door below the auger that has a closed position that retains fuel pellets in the auger such that the fuel pellets feed to the auger, and has an opened position to allows the pellets to empty from the hopper and away from the auger. A closing mechanism allows a user to selectively open or close the door.

30 Claims, 14 Drawing Sheets

(56) References Cited

U.S. PATENT DOCUMENTS

| | | | |
|---|---|---|---|
| 4,300,456 A * | 11/1981 | Messersmith | F23K 3/00 198/550.2 |
| 4,593,629 A * | 6/1986 | Pedersen | F23K 3/14 110/172 |
| 4,779,544 A * | 10/1988 | Stevens | F23B 5/00 110/288 |
| 4,810,510 A | 3/1989 | Lever et al. | |
| 4,823,684 A | 4/1989 | Traeger et al. | |
| 4,856,438 A * | 8/1989 | Peugh | F23B 5/04 110/322 |
| 4,909,235 A | 3/1990 | Boetcker | |
| 4,966,126 A | 10/1990 | Wu | |
| 5,197,379 A | 3/1993 | Leonard, Jr. | |
| 5,251,607 A | 10/1993 | Traeger et al. | |
| 5,429,110 A | 7/1995 | Burke et al. | |
| 5,490,452 A | 2/1996 | Schlosser et al. | |
| 5,809,991 A | 9/1998 | Pai | |
| 6,187,359 B1 | 2/2001 | Zuccarini | |
| 6,209,533 B1 | 4/2001 | Ganard | |
| 6,223,737 B1 | 5/2001 | Buckner | |
| 6,314,955 B1 | 11/2001 | Boetcker | |
| 7,360,639 B2 | 4/2008 | Sprouse et al. | |
| 7,530,351 B2 | 5/2009 | Leverty | |
| D623,013 S | 9/2010 | Alden et al. | |
| 7,900,553 B1 | 3/2011 | Maurin | |
| 7,984,709 B1 | 7/2011 | Byrnes et al. | |
| 8,267,078 B2 | 9/2012 | Kuntz | |
| D681,394 S | 5/2013 | Parel et al. | |
| 8,651,018 B1 | 2/2014 | Loud, III | |
| 8,899,145 B2 | 12/2014 | Harrison et al. | |
| 8,985,092 B2 | 3/2015 | Ahmed | |
| D760,539 S | 7/2016 | Colston | |
| 9,427,108 B2 | 8/2016 | Ahmed | |
| 9,441,838 B2 | 9/2016 | Baker | |
| 9,635,978 B2 | 5/2017 | Measom et al. | |
| 9,759,429 B2 | 9/2017 | Tucker | |
| 9,814,354 B2 | 11/2017 | McAdams et al. | |
| 9,913,559 B2 | 3/2018 | Polter et al. | |
| D817,091 S | 5/2018 | Colston | |
| 10,077,904 B2 | 9/2018 | Grant | |
| 10,201,247 B1 | 2/2019 | Jones | |
| 10,292,531 B1 | 5/2019 | Hancock et al. | |
| 10,495,317 B1 | 12/2019 | Hancock et al. | |
| D871,821 S | 1/2020 | Boltz et al. | |
| D901,244 S | 11/2020 | Baker et al. | |
| D907,424 S | 1/2021 | Measom et al. | |
| D915,138 S | 4/2021 | Bennion et al. | |
| D921,413 S | 6/2021 | Fitzpatrick | |
| D927,917 S | 8/2021 | Yueh | |
| D935,840 S | 11/2021 | Carter et al. | |
| 11,166,590 B2 | 11/2021 | Zheng | |
| 11,181,276 B2 | 11/2021 | Colston et al. | |
| 11,181,277 B2 | 11/2021 | Donnelly et al. | |
| 11,206,948 B2 | 12/2021 | Measom et al. | |
| 11,231,178 B2 | 1/2022 | James | |
| D945,208 S | 3/2022 | Duan et al. | |
| 2001/0017131 A1 | 8/2001 | Sim | |
| 2004/0226550 A1 | 11/2004 | Hutton et al. | |
| 2004/0255926 A1 | 12/2004 | Waits et al. | |
| 2005/0126556 A1 | 6/2005 | Bossler | |
| 2008/0085172 A1 | 4/2008 | Harman et al. | |
| 2008/0098906 A1 | 5/2008 | Davis | |
| 2009/0056695 A1 | 3/2009 | Cosgrove | |
| 2009/0293860 A1 | 12/2009 | Carlson | |
| 2010/0218754 A1 | 9/2010 | Kuntz | |
| 2011/0073101 A1 | 3/2011 | Lau et al. | |
| 2011/0136066 A1 | 6/2011 | Geselle et al. | |
| 2011/0275023 A1 | 11/2011 | Knight | |
| 2013/0160757 A1 | 6/2013 | Atemboski et al. | |
| 2013/0298894 A1 | 11/2013 | Kleinsasser | |
| 2013/0327259 A1 | 12/2013 | Freeman | |
| 2014/0326232 A1 | 11/2014 | Traeger | |
| 2014/0326233 A1 | 11/2014 | Traeger | |
| 2014/0373827 A1 | 12/2014 | Zhu et al. | |
| 2014/0377431 A1 | 12/2014 | Kazerouni | |
| 2015/0079250 A1 | 3/2015 | Ahmed | |
| 2015/0136109 A1 | 5/2015 | Baker | |
| 2015/0182074 A1 | 7/2015 | Bucher et al. | |
| 2015/0320259 A1 | 11/2015 | Tucker | |
| 2016/0174767 A1 | 6/2016 | Schlosser et al. | |
| 2016/0245529 A1 | 8/2016 | McClean | |
| 2016/0255999 A1 | 9/2016 | McAdams et al. | |
| 2016/0327263 A1 | 11/2016 | Traeger | |
| 2016/0341423 A1 | 11/2016 | Johnson | |
| 2017/0065124 A1 | 3/2017 | Colston | |
| 2017/0067649 A1 | 3/2017 | Colston | |
| 2017/0164783 A1 | 6/2017 | Sauerwein et al. | |
| 2017/0196400 A1 | 7/2017 | Colston | |
| 2017/0198917 A1 | 7/2017 | Gillespie et al. | |
| 2017/0219213 A1 | 8/2017 | Measom et al. | |
| 2017/0289257 A1 | 10/2017 | Colston | |
| 2017/0343218 A1 | 11/2017 | Tucker | |
| 2017/0370592 A1 | 12/2017 | Bogazzi | |
| 2018/0028018 A1 | 2/2018 | Barnett et al. | |
| 2018/0168397 A1 | 6/2018 | Colston | |
| 2018/0192822 A1 | 7/2018 | Cedar et al. | |
| 2018/0213970 A1 | 8/2018 | Colston | |
| 2018/0296031 A1 | 10/2018 | Terrell, Jr. et al. | |
| 2018/0317707 A1 | 11/2018 | Dahle | |
| 2018/0368617 A1 | 12/2018 | Allmendinger | |
| 2018/0368618 A1 | 12/2018 | Meason et al. | |
| 2019/0008321 A1 | 1/2019 | Allmendinger | |
| 2019/0290064 A1 | 9/2019 | Colston et al. | |
| 2019/0290066 A1 | 9/2019 | Colston | |
| 2019/0365152 A1 | 12/2019 | Dahle et al. | |
| 2019/0374065 A1 | 12/2019 | Hancock et al. | |
| 2019/0387924 A1 | 12/2019 | Zheng | |
| 2020/0116349 A1 | 4/2020 | Rahmani et al. | |
| 2020/0158337 A1 | 5/2020 | Baker et al. | |
| 2020/0214501 A1 | 7/2020 | Gafford et al. | |
| 2020/0237148 A1 | 7/2020 | Donnelly | |
| 2020/0333011 A1 | 10/2020 | Ahmed et al. | |
| 2021/0267413 A1 | 9/2021 | Roberts et al. | |
| 2021/0298333 A1 | 9/2021 | Strong et al. | |
| 2021/0341144 A1 | 11/2021 | Parsons et al. | |
| 2021/0356130 A1 | 11/2021 | Li | |
| 2021/0361115 A1 | 11/2021 | Colston et al. | |
| 2022/0046937 A1 | 2/2022 | Simon et al. | |
| 2022/0082262 A1 | 3/2022 | Colston et al. | |

FOREIGN PATENT DOCUMENTS

| | | | |
|---|---|---|---|
| DE | 4020171009570011 S | | 6/2018 |
| WO | 2013116946 A1 | | 8/2013 |
| WO | 2017044598 A1 | | 3/2017 |
| WO | 2017064528 A1 | | 4/2017 |
| WO | 2018125681 A1 | | 7/2018 |
| WO | 2018208919 A1 | | 11/2018 |
| WO | PCT/US2021/020303 | | 5/2021 |
| WO | PCT/US21/029170 | | 9/2021 |
| WO | PCT/US2020/035535 | | 10/2021 |

OTHER PUBLICATIONS

May 7, 2020, Publisher: International Search Report issued by the ISA/US for PCT/US2020/020487 dated May 7, 2020.

* cited by examiner

HOPPER CLEANOUT AND PELLET HANDLING MECHANISM

FIELD OF THE INVENTION

This disclosure relates to cooking grills in general and, more particularly, to wood pellet fueled cooking grills.

BACKGROUND OF THE INVENTION

Wood pellet cooking grills are known to the art. In general, such devices have an electrically driven auger that transports small compressed wood pellets from an exterior hopper to combustion chamber, or firepot, inside an enclosed cooking chamber with an openable lid. This combustion chamber is supplied with combustion air pressurized and driven by a fan through ductwork to an area surrounding the firepot and then though holes in the exterior of the firepot feeding air into the combustion space. The hot gas from the firepot heats the food placed on a cooking grate inside the cooking chamber.

The hopper may be supplied with the wood fuel pellets at the start of a cooking operation and/or periodically thereafter or at other times. Unfortunately, storing unused pellets on a long-term basis in the hopper can lead to problems. Such problems may include moisture absorption and other forms of spoilage. Jamming of the auger and/or damage to other components may result from wet pellets. Additionally, not every cooking operation relies entirely on a single type of wood pellet. Therefore, there is some need to change pellet types during operation. There is a further need to deal with pellets that may be removed in a convenient way in which they can be stored for future use and against moisture and other spoilage outside the hopper.

Therefore, what is needed is a system and method for addressing the above and related problems.

SUMMARY OF THE INVENTION

The system of the present disclosure, in one aspect thereof, comprises a system having a hopper that receives fuel pellets and direct the pellets under gravity feed to an auger that moves the pellets into a firepot inside a cooking chamber of a grill. The system includes a door below the auger that has a closed position that retains fuel pellets in the auger such that the fuel pellets feed to the auger, and that has an opened position to allows the pellets to empty from the hopper and away from the auger. A closing mechanism allows a user to selectively open or close the door.

The door may be affixed in place via a hinge in parallel with the auger. The door may span a distance from the hinge to the auger when the door is in the closed position. The door may be held in the closed position by an arm in contact with the door, the arm being affixed to a handle that can be pulled by a user to release the door from the closed position. In some cases, the hinge is spring loaded to bias the door toward the open position. The arm may be biased to a retracted position such that the door is moved to the closed position when the arm is released.

Some embodiments further comprise a chute below the door that directs fuel pellets coming through the door in the open position into a receptacle. The door may be directly above the receptacle and at least a portion of the chute may allow the fuel pellets to fall directly into the receptacle. The system may include a bracket in a fixed location below the hopper, the bracket having a pair of flanges spaced apart to receive a receptacle having a ridge that rests on the pair of flanges retaining the receptacle.

The invention of the present disclosure, in another aspect thereof, comprises a system including a cooking grill having a firepot in a cooking chamber thereof, an auger within an auger tube that moves fuel pellets into the firepot from outside the cooking chamber, and a hopper situated over a portion of the auger and providing fuel pellets to the auger. The system has a drain chute below the auger that catches fuel pellets not captured by the auger and feeds by gravity into a receptacle, and at least one door having a closed position whereby pellets are prevented from flowing away from the auger and into the drain chute, and an open position whereby the fuel pellets are allowed to flow into the drain chute.

In some cases, the door is retained in the closed position by a arm in contact with a bottom of the door. The arm may extend to a handle that is moveable by a user to displace the arm and allow the door to move to the open position. The arm may be spring biased to push the door back into the closed position when the handle is released. The door may be spring biased to open when the arm is displaced to allow the door to move to the open position.

In other embodiments, the door is moved from the closed to the open position by displacing a lift hook extending from the door upwardly into the hopper. In such cases, the door may be hinged to the hopper.

In some cases, the auger tube extends below the hopper and defines an upward facing opening over the auger, and the door has a cooperating contour that engages the auger tube when in the closed position leaving the opening exposed to fuel pellets from the hopper. The auger tube may extend below the hopper and define an upwardly facing opening allowing fuel pellets to be captured by the auger from the hopper. The door may extend to the auger tube when in the closed position and remain spaced apart from the auger tube when in the open position. In further embodiments, the door comprises a pair of doors, with one situated on opposite sides of the auger tube.

In further embodiments, a bracket is in a fixed location below the hopper to retain a removeable receptacle in a location such that fuel pellets leaving the drain chute are received in the receptacle.

The invention of the present disclosure, in another aspect thereof, includes a hopper feeding fuel pellets to an auger for delivery to a firepot inside a cooking chamber, a cabinet retaining the hopper and locating a bracket in fixed relationship with respect to the hopper, and a receptacle removable retained by the bracket in a fixed position below the hopper. A drain chute below the auger directs fuel pellets leaving the hopper, but not transported by the auger, into the receptacle. A gravity flow pathway from the hopper, to the drain chute, and into the receptacle drains substantially all of the fuel pellets from the hopper into the receptacle.

In some embodiments, the bracket comprises a pair of spaced apart downwardly extending walls having a pair of inwardly projecting flanges. The receptable may comprise a body defining an interior and having a width less than a distance between the inwardly projecting flanges. The body may provide an outwardly projecting ridge that exceeds the distance between the inwardly projecting flanges but is less than a distance between the spaced apart walls. In some cases, the bracket comprises a rear wall extending downward past the inwardly projecting flanges that arrests insertion of the receptacle into the bracket by contact therewith.

The invention of the present disclosure, in another aspect thereof, comprises a system including a bracket in a fixed relationship with respect to a hopper drain chute of a pellet grill. The bracket further comprises a pair of spaced apart downwardly extending walls each having an inwardly projecting flange thereon. The system includes a receptacle defining a substantially rectilinear horizontal cross section and having a width less than a distance between the inwardly projecting flanges. The receptacle provides an outwardly projecting ridge sized to rest upon the inwardly projecting flanges when the receptacle is placed between the two spaced apart walls.

In some embodiments, a rear wall is affixed to the basket and located so as to center the receptable with respect to the bracket when the receptacle is inserted against the rear wall. In some cases, a handle affixes to the receptacle. The system may include a removable lid fitting the receptacle. The receptacle may provide a plurality of outwardly projecting ridges to allow the receptacle to be inserted into the bracket at a plurality of elevations with respect to the drain chute.

DETAILED DESCRIPTION OF THE PREFERRED EMBODIMENTS

Figure 1:
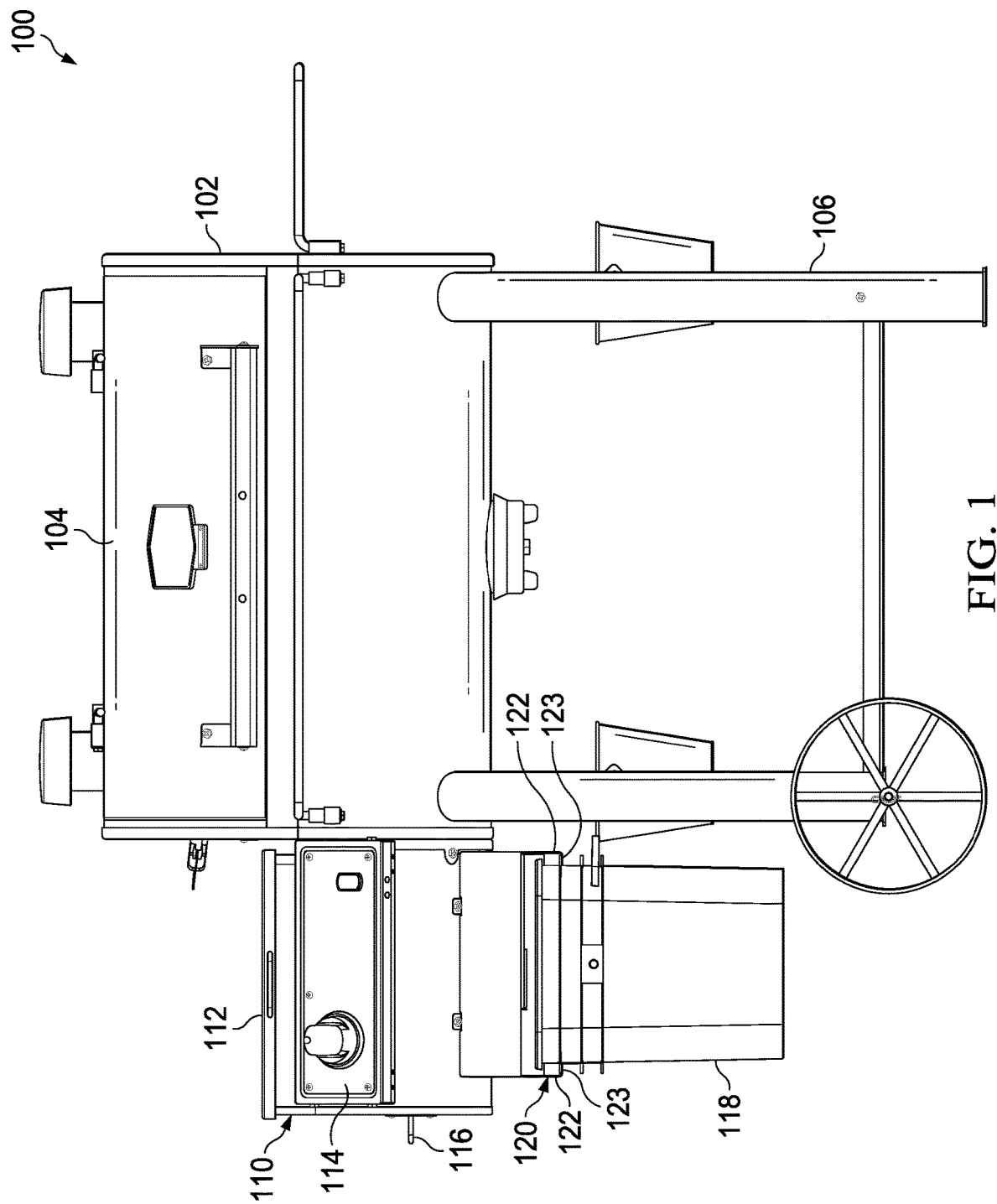
FIG. 1 is an external elevational view of a pellet grill with a hopper cleanout system and pellet storage device according to aspects of the present disclosure.

Referring now to FIG. 1, an external elevational view of a pellet grill 100 with a hopper cleanout system (e.g., 220 below) and pellet storage device 118 according to aspects of the present disclosure is shown. The grill 100 may be a pellet fueled grill or utilize other dry and/or granular fuel that may be transported internally by auger. In some embodiments, the grill 100 includes a cooking chamber 102 having an openable lid 104. Venting, smoking, and heat control may be provided as is known in the art.

A hopper cabinet 110 with an openable lid 112 may be affixed to the cooking chamber 102 in such a way that fuel can be transported by auger into a firepot inside the cooking chamber as discussed further below. A control panel 114 may be provided to allow a user to control delivery of pelletized fuel and operation of the grill 100. A drain handle 116 may be provided that is accessible on an exterior of the grill 100, or the hopper cabinet 110 in particular. This handle may be used to activate the hopper cleanout system 220 and drain any fuel pellets not yet in the auger into a pellet receptacle 118. The hopper cabinet 110 or other location on the grill 100 may provide an attachment bracket 120 that retains the pellet receptacle in an appropriate location (e.g., below the cleanout mechanism 220 and/or below an appropriate chute or drain for catching fuel pellets).

Figure 2:
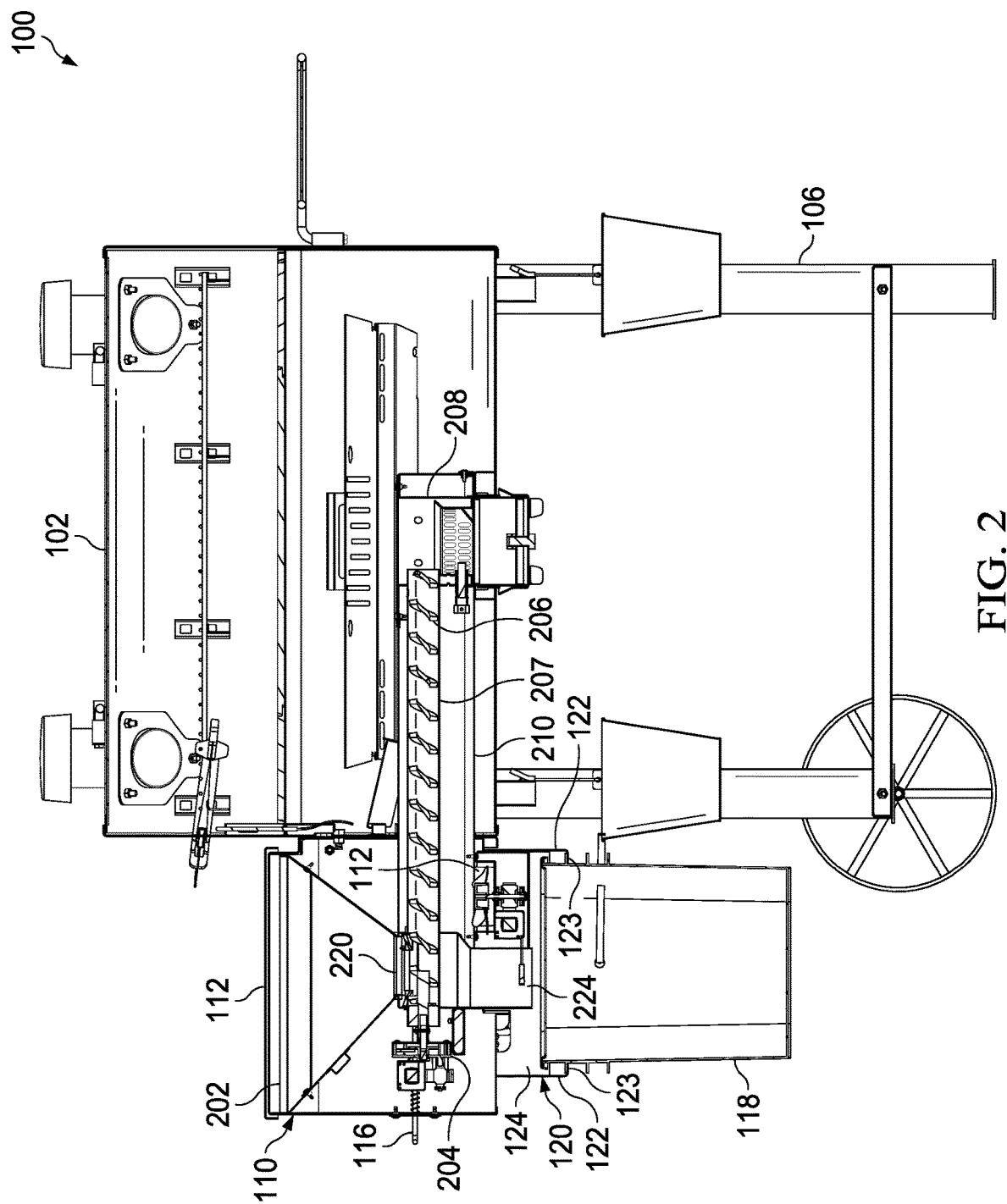
FIG. 2 is a side cutaway view of the pellet grill of FIG. 1.

Referring now to FIG. 2, a side cutaway view of the pellet grill 100 of FIG. 1 is shown. A fuel hopper 202 is accessible under the lid 112 for a user to pour in a quantity of pelletized fuel. The fuel hopper 202 may vary in size but is generally large enough to provide a satisfactory quantity of fuel to support a cooking operation for an adequate period of time. Additional fuel can generally be added to the hopper 202 during the cooking process as there is no combustion occurring at or near the hopper. A screen 316 (FIG. 3) may be provided to prevent debris or chunks of fuel over a specific size from entering completely into the hopper 202.

Fuel may be transported from the hopper 202 via an auger 206 through a tube 207 running to a firepot 208. The auger 206 is powered by an electric motor 204, for example. The auger 206 may be controlled as to rotation speed and timing via the user control panel 114. This provides control over temperature within the cooking chamber 102. Combustion occurs in the firepot 208, which may be known in the art. The firepot 208 contains a number of openings for admitting combustion air supplied via plenum 210 with a fan 112 drawing air from the outside. The motor 204, auger 206, tube 207, firepot 208, plenum 210, fan 112 and the associated parts and wiring necessary to provide operation may be those that are known in the art.

The grill 100 may be provided with a hopper cleanout mechanism 220 that allows pellets still within the hopper 202 to be easily removed for any reason. Fuel may be removed at the end of a cooking session, for example. They may also be removed if the fuel is to be switched during cooking, or for any other reason. In some embodiments the cleanout mechanism 220 is actuated by handle 116, which is described further below. However, actuation could be made automatic by use of servos or other actuators. The cleanout mechanism 220 may provide a drain chute 224 that guides fuel pellets released from the hopper 202 into the receptacle 118.

It should be appreciated that, according to various embodiments herein, that the flow of fuel pellets through the hopper 220, cleanout mechanism 220, and chute 224 may occur via gravity feed. Fuel pellets entering the auger tube 207 are moved via auger into the firepot 208. However, fuel pellets that are not moved by the hopper may travel entirely via gravity feed based on the operation of the cleanout mechanism 220. To that end, in some embodiments, the cleanout mechanism 220 is entirely beneath the hopper 220 and may not have any lateral displacement relative to the hopper 202. Similarly, the chute 224 may be situated entirely within the horizontal of overhead footprint of the receptacle 224. In some embodiments, the chute 224 may provide some lateral displacement of falling fuel pellets but it may not. In some embodiments, the chute may simply provide a guide for falling fuel pellets to keep them from otherwise bouncing or falling outside the receptacle, but may not provide intentional later displacement of falling pellets.

Figure 3:
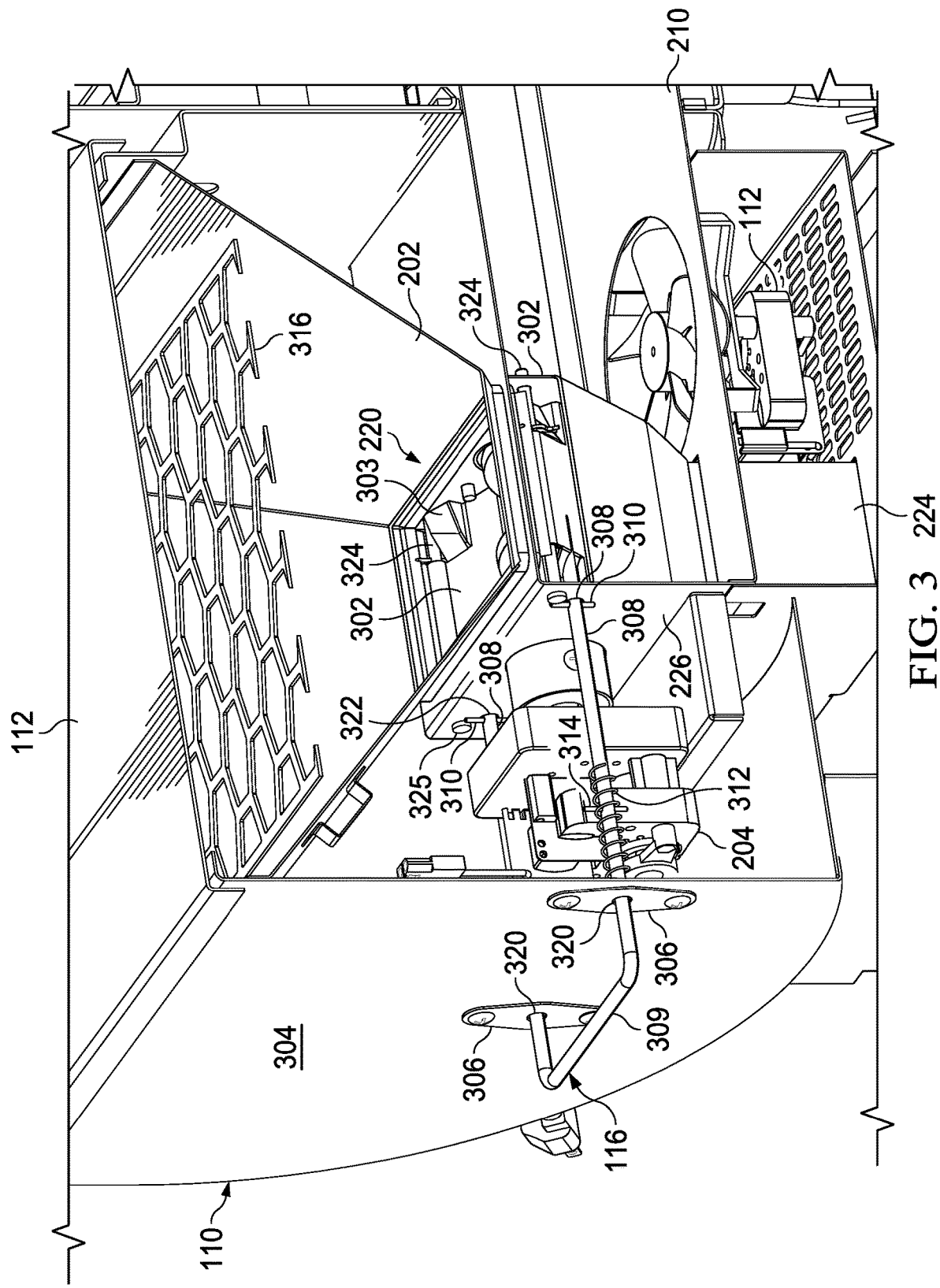
FIG. 3 is a closeup side cutaway view of a hopper cleanout mechanism of the pellet grill of FIG. 1.
Figure 4:
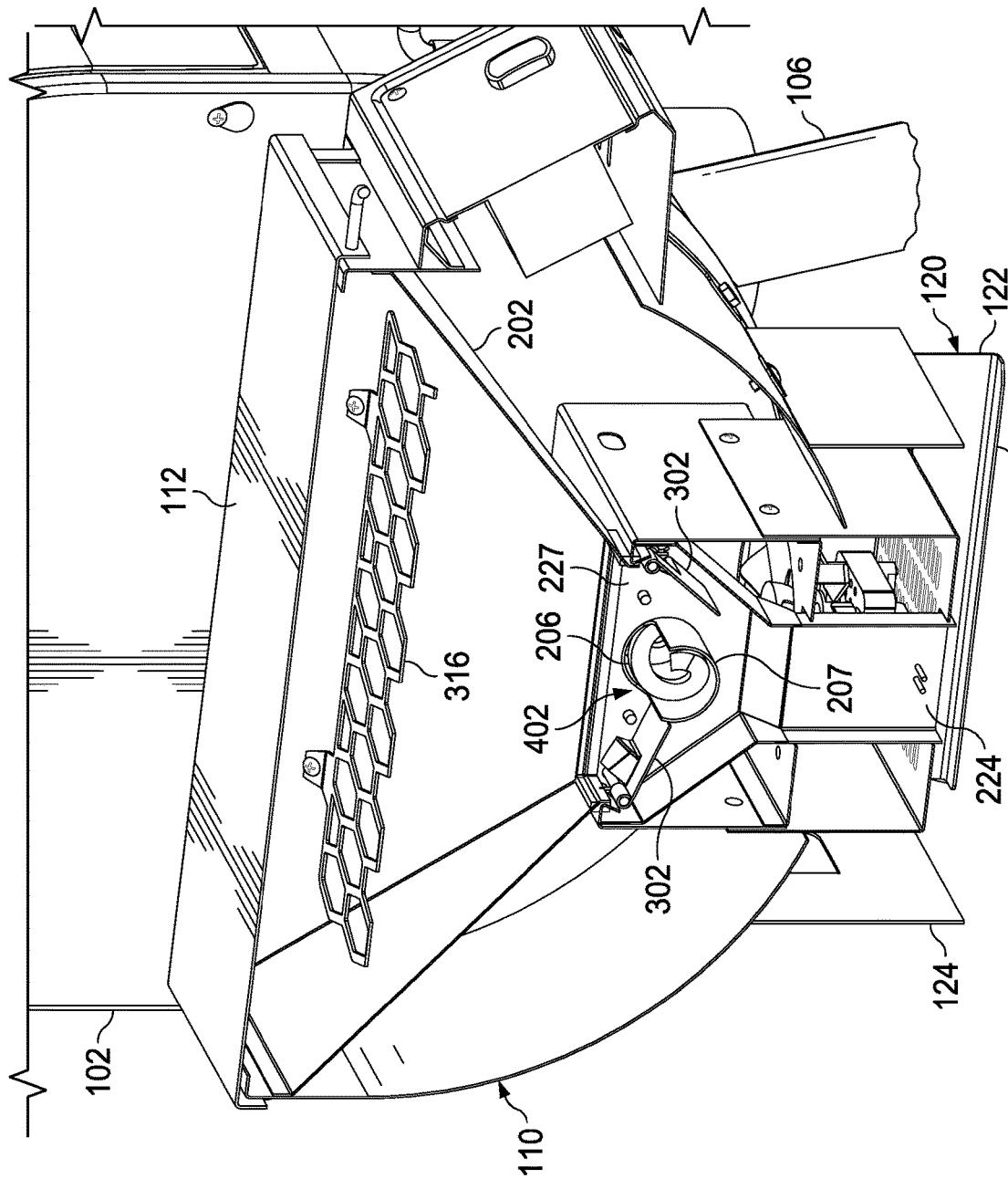
FIG. 4 is an end cutaway view of the hopper cleanout mechanism of FIG. 3.
Figure 5:
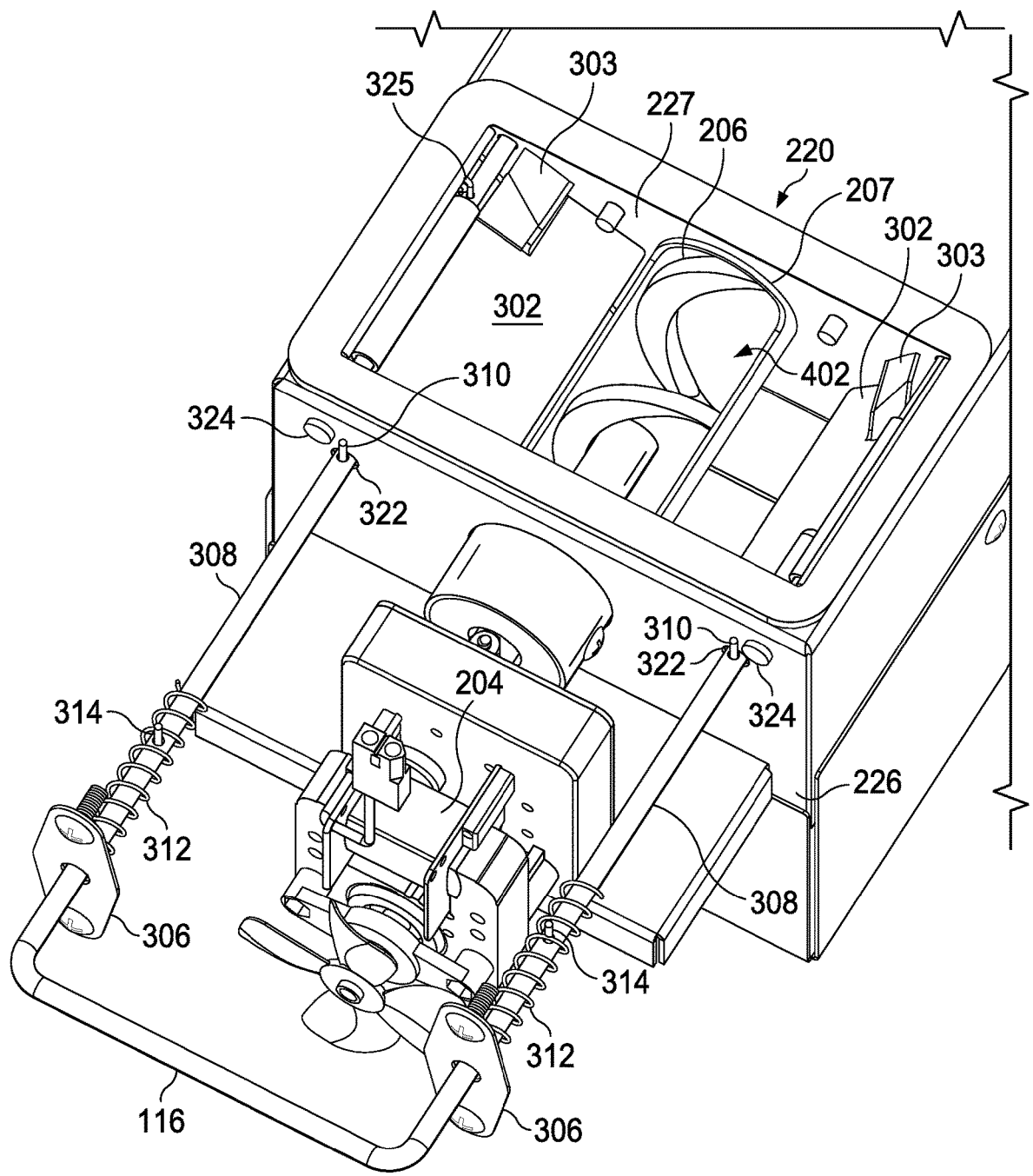
FIG. 5 is closeup perspective view of the hopper cleanout mechanism of FIG. 3.

Referring now to FIG. 3, a closeup side cutaway view of a hopper cleanout mechanism 220 of the pellet grill 100 of FIG. 1 is shown. Here the cleanout mechanism 220 is shown with the other nearby grill 100 components in place. Reference may also be made to FIG. 4, which provides an end cutaway view of the hopper cleanout mechanism 220. Referring also to FIG. 5 a closeup perspective view of the hopper cleanout mechanism 220 with several adjoining components removed is shown.

The hopper 202 may be configured in the shape of an inverted pyramid. The sides may not all have the same size or shape. In effect, the hopper 202 provides a larger upper opening near the lid 112 and decreases in size over a vertical distance to the auger 206 and cleanout mechanism 220. Thus, the hopper 202 acts as both a funneling device and a storage space.

The cleanout mechanism 220 may surround part of the auger 206 and/or tube 207. In some embodiments, an upward facing cutout 402 in the tube 207 exposes the auger 206 from above to fuel pellets in the hopper 202. The cleanout mechanism 220 may include one or more doors 302 (shown here as a pair). When the cleanout mechanism 220 is closed, or not activated, the doors may span from the hopper 220 to the auger 206 and/or tube 207 at or near the location of the cutout 402. The auger 206 may be mounted somewhat below the bottom, smaller end of the hopper 202 and the doors may provide a downward slope from the termination of the hopper 202 to the opening 402, tube 207, and/or auger 206 even with the doors are closed. The doors 302 may be opened, which creates an opening on either side of the auger 206 or tube 207 through which any pellets in the hopper 202 that are not entering into the auger tube 207 via the opening 402 will fall. A drain chute 224 may funnel pellets drained from the hopper 202 via the opened doors 302 into receptacle 118 (FIGS. 1-2).

The handle 116 may serve to open and close the doors 302. As shown, the doors 302 are closed when the handle is released, and opened when the handle 116 is pulled or drawn away from the cabinet 110 (e.g., to the left, as illustrated). The handle 116 of the illustrated embodiment may comprise a one-piece component with parallel arms 308 joined by a transverse grip 309. A covering or pad (not shown) may be provided on the grip 309.

The handle 116 may spring loaded to return to an inward position as illustrated, wherein the arms 308 hold the doors 302 in the closed position. By pulling the handle outward, the arms 308 are removed from the doors 302 allowing them to open. The doors may be hinged by hinge pins 324, near the outside of the bottom end of the hopper 202. The hinge pins 324 may be spring loaded (e.g., spring 325) to help ensure reliable opening even if the pellet load on the doors 302 is light.

The handle 116 may pass from outside the hopper cabinet 110 to the cleanout mechanism 220 via apertures 320 in a panel 304 of the cabinet 110. In some embodiments, apertures 320 are flanked by reinforcements 306. As illustrated, the path of the arms 308 is on either side of the motor 204 which drives the auger 206. As can be seen in FIG. 4 the handle 116 and arms 308 may be slightly above the auger 206 depending upon the hinge pin 324 location and size of the doors 302.

A pair of springs 312 may serve to return the handle 116 to the withdrawn or closed position. The springs 312 may be coil springs surrounding the arms 308. A spring pin 314 may provide retention of the springs 312 onto the arms 308. As shown, the springs 312 may compress between the pins 314 and the wall 304 to provide return function. The arms 308 may pass through apertures 322 in an end wall 226 to reach doors 302. The end wall 226 may represent the termination of the plenum 210, the chute 224, and/or the cleanout mechanism 220. Over insertion of the arms 308 and handle 116 may be prevented by pins 310 at the apertures 322.

The end wall 226 may also provide a mounting location for one end of hinge pins 324. The opposite end of hinge pins 324 may be anchored in opposite wall 227. Wall 227 may be an opposite wall of the chute 324 and/or the cleanout mechanism 220 in general.

Figure 6:
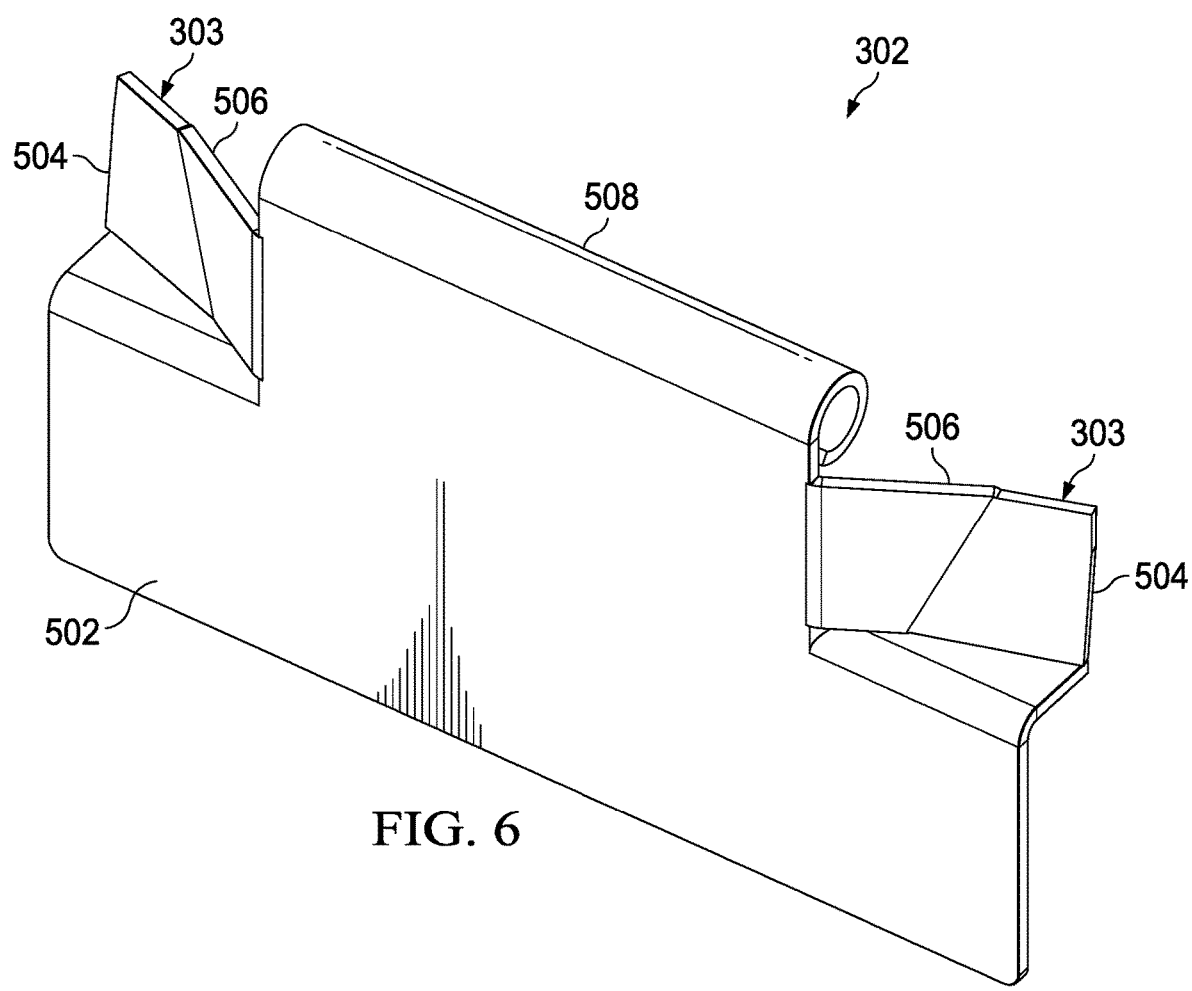
FIG. 6 is a bottom perspective view of a closure door of a hopper cleanout mechanism according to aspects of the present disclosure.

The doors 302 may rest against arms 308 when closed and the arms 308 may prevent the doors 302 from opening. A single door 302 is illustrated in FIG. 6. Here it can be seen that the door 302 may comprise a planar panel 502 having a hinge knuckle 508 along one side edge thereof. In some embodiments, the panel 502 may be convex, concave, or otherwise curved rather than planar. On ends of the panel 502 ramps 303 may be provided such that the doors 302 can open relatively widely, yet still be closable by movement of the arms 308. The 308 may encounter the ramp 303 allowing the door to be pushed closed by linear movement of the arms 308 only. Once the arms 308 have fully closed the doors, panel 502 may rest on the arm 308 rather than the ramp 303. Thus, even relatively heavy loads on the doors 302 are not likely to open the doors 302 unless the handle 116 is pulled.

In some embodiments the ramps 303 comprise a shallower portion 504 leading into a steeper portion 506. Ramps 303 may also be provided at both ends of the panel 502 such that a single door design 302 can be used for both sides of the cleanout mechanism 220 (e.g., both sides of the opening 402 in the auger tube 207.

Figure 7:
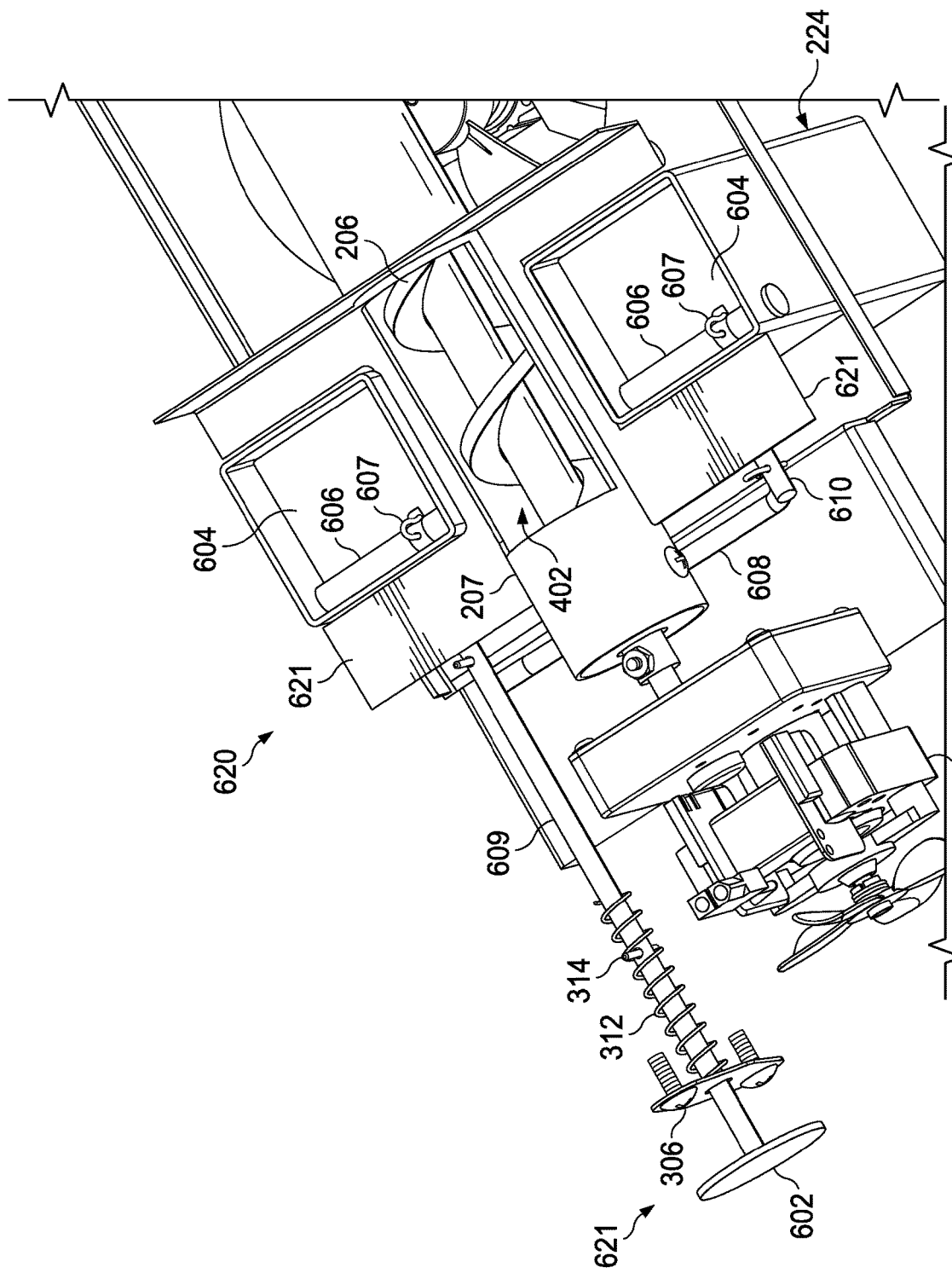
FIG. 7 is a closeup perspective view of another hopper cleanout mechanism according to aspects of the present disclosure.

Referring now to FIG. 7, a closeup perspective view another hopper cleanout mechanism 620 according to aspects of the present disclosure is shown. The hopper cleanout mechanism 620 may be utilized in place of the hopper cleanout mechanism 220 discussed above. For ease of illustration, certain surrounding components of the grill 100 are not shown in FIG. 7. The cleanout mechanism 620 provides a pair of ramps 621 on opposite sides of the opening 402 in the auger tube 207 (e.g., rather than having doors 302 act as ramps). The ramps 621 may be angle generally downward toward the opening 402.

The ramps 621 provide locations for a set of trap doors 604 that are selectively openable to drain the hopper 202. The trap doors 604 have a hinge knuckle 606 retaining a spring-loaded hinge pin 607 that tends to urge the doors 604 open (e.g., move them downward into a vertical position). This may help to ensure reliable opening of the doors 604 even if the pellet load is light.

The doors 604 may be retained in a closed position, that holds fuel pellets in the hopper 202 by a user operable handle mechanism 621. A pair of parallel arms including a longer primary arm 609 and a spaced apart secondary shorter arm 610. These arms 609, 610 may have a link 608 joining them such that they move or retract from the doors 604 in unison, or substantially so. The arms 609, 610 may come to rest under the doors 604 when the cleanout mechanism 620 is closed, thereby retaining the doors 604 in the closed position. Opening of the mechanism 620 and the doors 604 may be accomplished by a pull knob 602 attached to the primary arm 609 which extends from the cleanout mechanism 620 to a location accessible to the user outside the cabinet 110. For example, the arm 609 may pass through panel 304 (not illustrated here) and reinforcement 306.

Spring 312 may be retained on the arm 609 by spring retainer pin 314 and compress between the pin 314 and panel 304 and/or reinforcement 306 when the knob 602 is pulled. This moves the arms 609, 610 from under the doors 604 allowing the doors 604 to open under weight of fuel pellets and/or force of spring pins 607. Release of the knob 602 allows the spring 312 to move arms 609, 610 back under the doors 604 closing them. The strength of the spring 312 compared to the spring loaded hinge pins 607 may be strong enough to force the doors 604 closed against the spring loaded hinge pins 607 but weak enough that a user can easily pull the knob 602 against the force of the spring 312.

Figure 8:
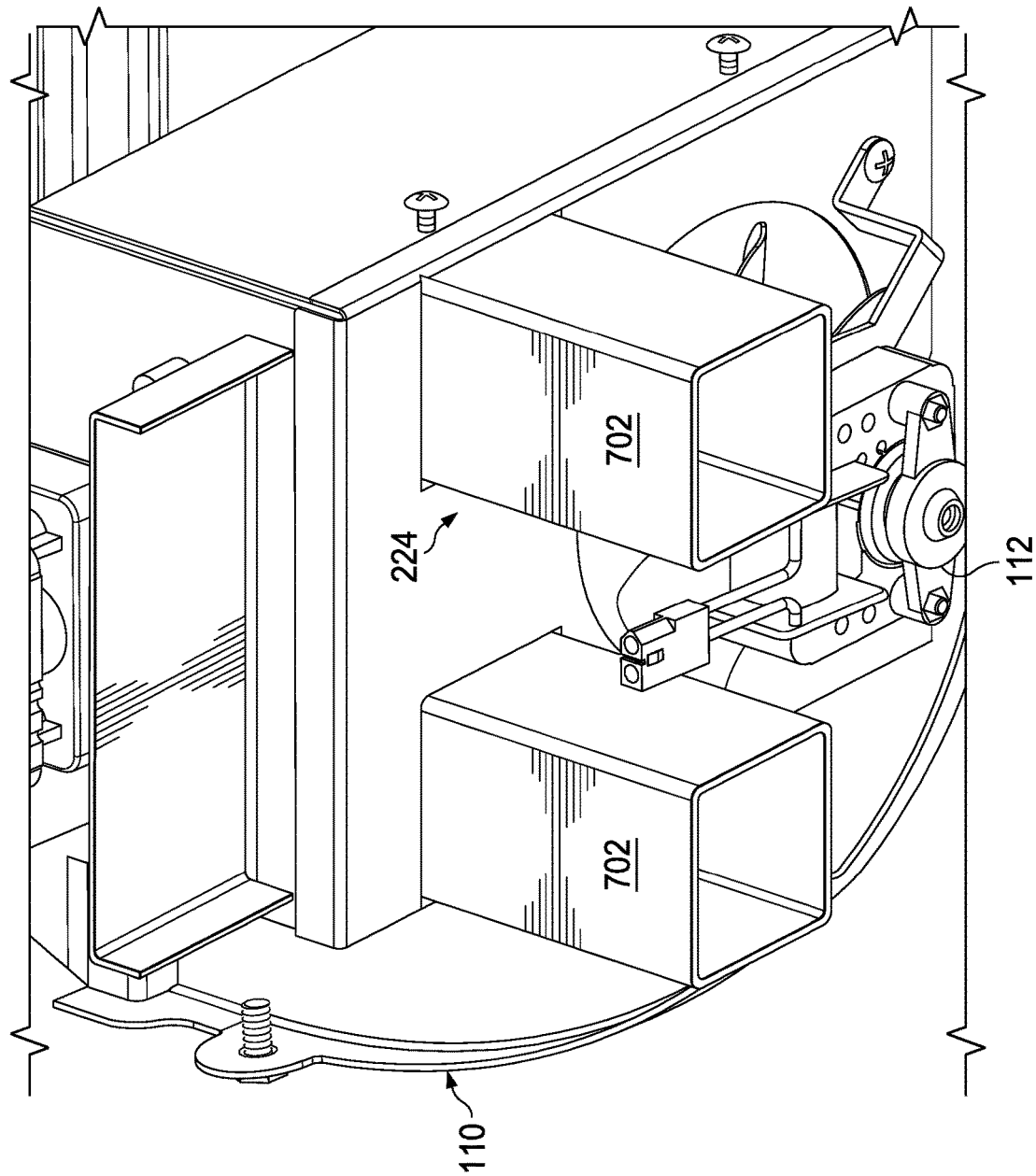
FIG. 8 is a bottom closeup perspective view of the hopper cleanout mechanism of FIG. 7.

Referring now to FIG. 8, a bottom closeup perspective view of the hopper cleanout mechanism 620 of FIG. 7 is shown. Here the chute 224 provides parallel conduits 702, one under each door 604, through which fuel pellets fall from the hopper 202.

It should be appreciated that, in all embodiments utilizing trap doors (e.g., doors 302, 604) that the doors may not be completely level, but that they nevertheless open to provide a gravity aided downward pathway for pellets to fall (e.g., into chute 224). In some embodiments, there is an unobstructed pathway straight down for the pellets to begin to fall. In other embodiments, a sliding pathway is provided adjacent to the doors (e.g., panels 621) and/or the doors (e.g., 302, 604) open to a sliding pathway immediately (e.g., chute 224) such that fuel pellets slide from the hopper rather than necessarily having a free-fall pathway. In some cases, both free-fall and slide may occur. In any event, the fuel pellets may be handled such that no action is necessary to drain or clean the hopper of pellets apart from opening the mechanism (e.g., 220, 620).

Figure 9:
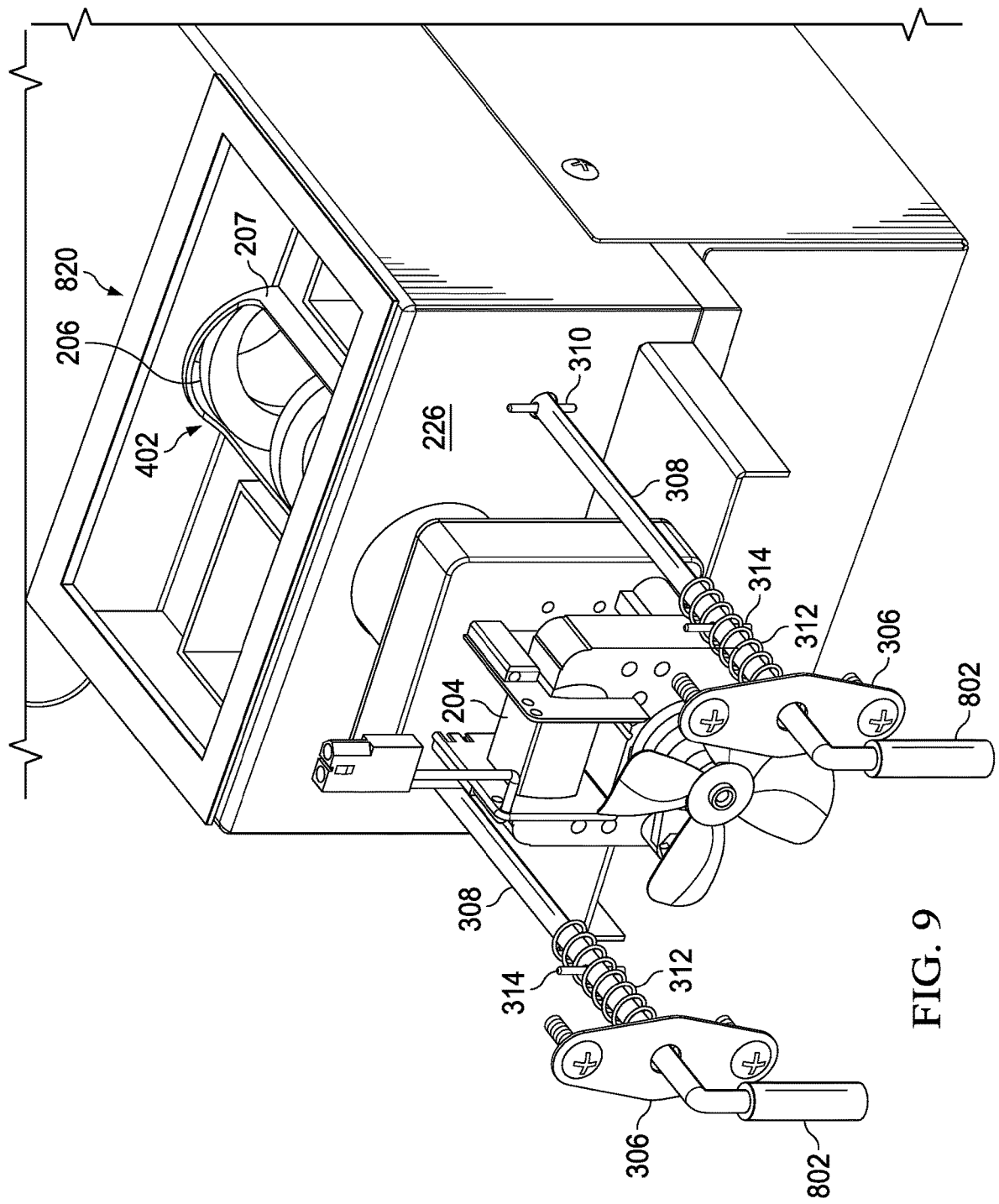
FIG. 9 is a closeup perspective view of another hopper cleanout mechanism according to aspects of the present disclosure.

Referring now to FIG. 9, is a closeup perspective view of another hopper cleanout mechanism 820 according to aspects of the present disclosure. The cleanout mechanism 820 is similar to the cleanout mechanism 620 but for the release operation and components. Here, two parallel arms 308 operate the respective doors (e.g., 604, out of view). However, they are not joined together, either inside the cabinet 110 (not shown) or elsewhere. Instead, each arm 308 passes out of the cabinet 110 (e.g., via panel 304, not shown, and/or reinforcements 306) to be available to a user. A pair of transverse pulls handles 302 may be provided at the termination of each of arm 308 allowing the user to selectively open one or both of the associated doors (e.g., 604) of the cleanout mechanism 820.

Figure 10:
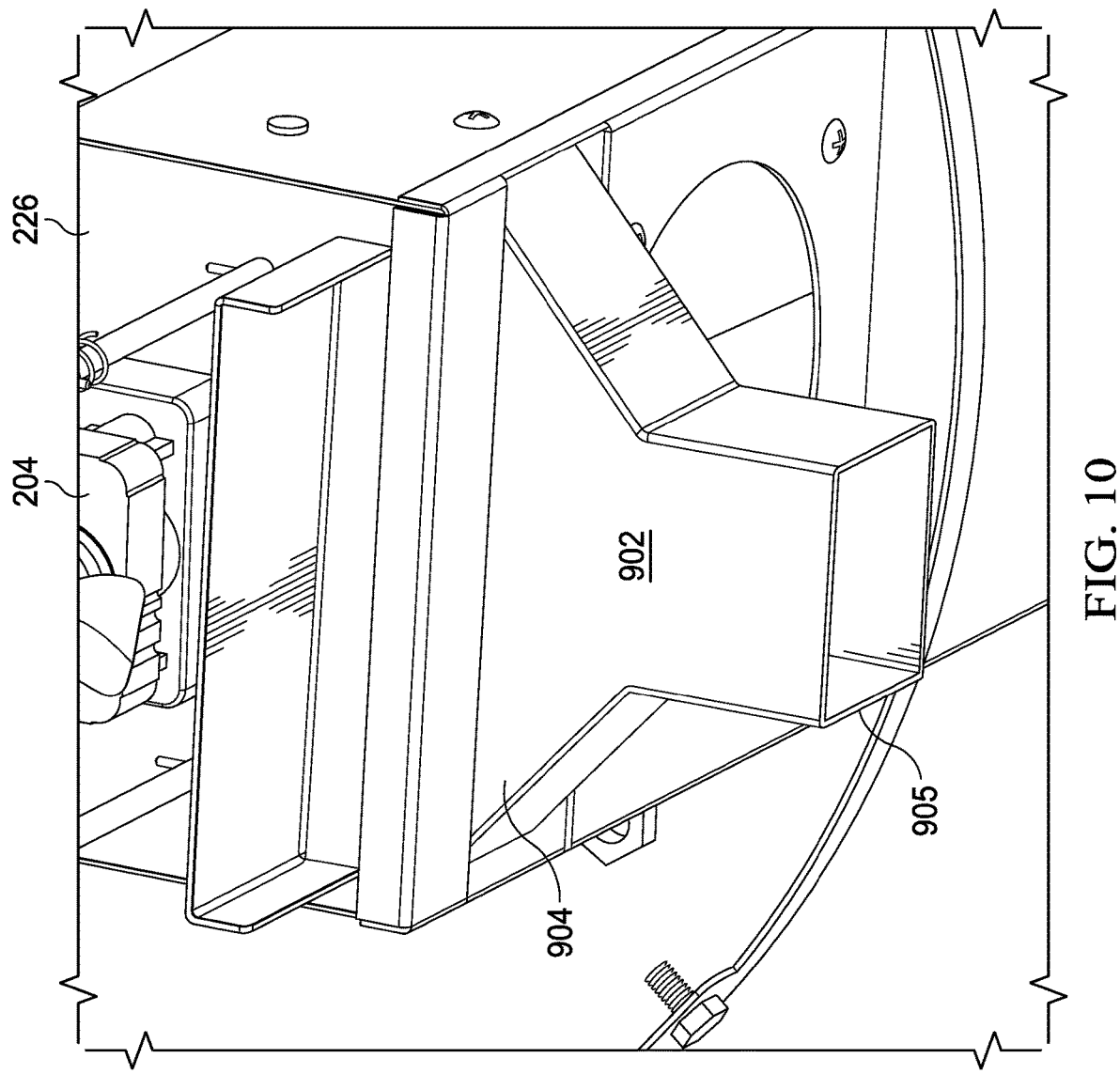
FIG. 10 is a bottom perspective view of a hopper cleanout cute according to aspects of the present disclosure.

Referring now to FIG. 10 is a bottom perspective view of a hopper cleanout cute 902 according to aspects of the present disclosure is shown. The cleanout chute 902 may be utilized in place of the chute 224 (discussed above) or others. The principle of operation is similar between the chute variations. Here, however, the chute 902 provides a wide funnel portion 904 that may be immediately below the doors (e.g., doors 302 or 604) that leads to a narrower, or more directed conduit portion 905. The conduit 905 may be straight, as shown, or could be angled to provide further direction for pellet drainage if desired.

Figure 11:
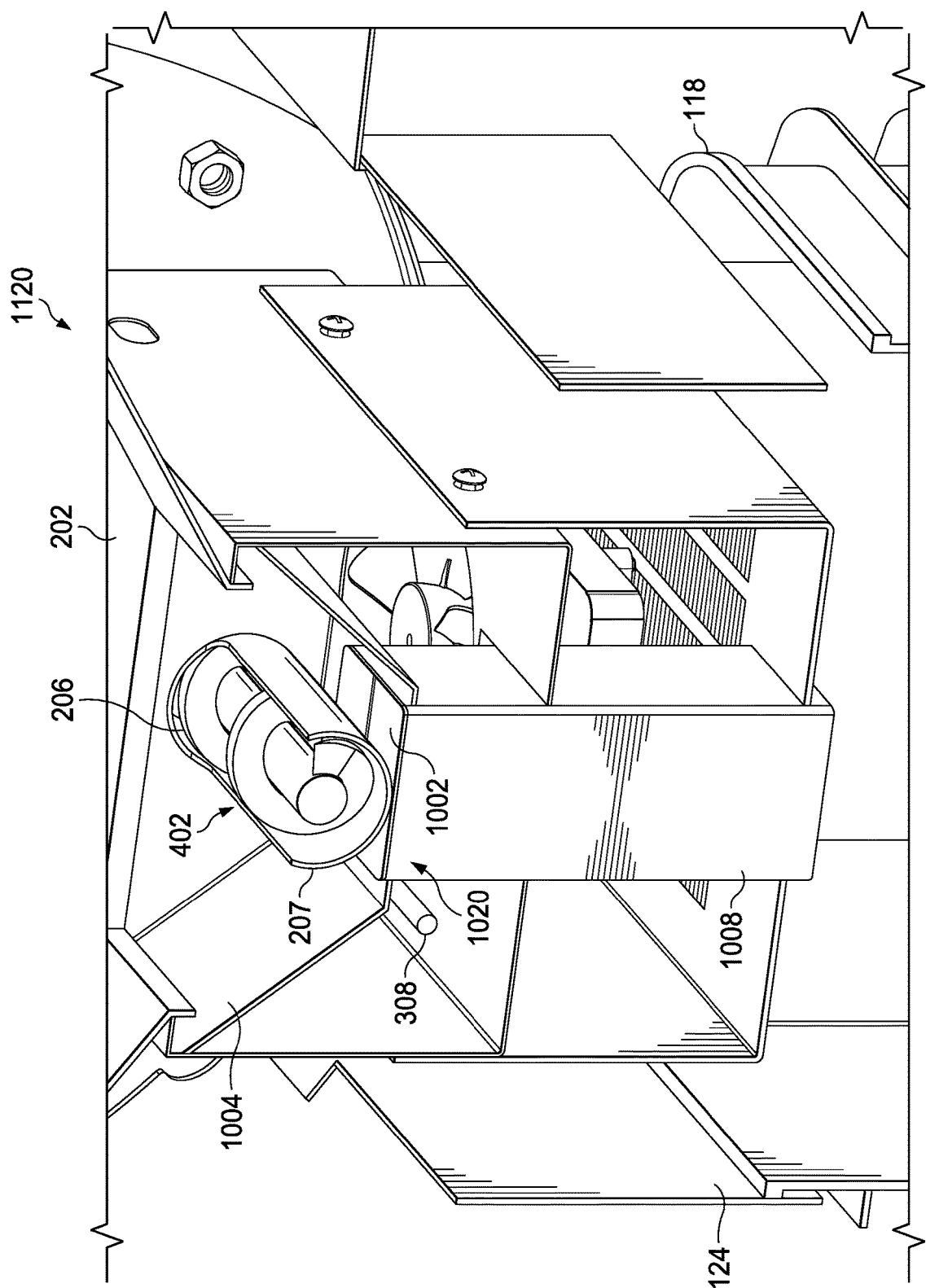
FIG. 11 is a cutaway perspective view of another embodiment of a hopper cleanout mechanism according to aspects of the present disclosure.

FIG. 11 is a cutaway perspective view of another embodiment of a hopper cleanout mechanism 1020 according to aspects of the present disclosure. The cleanout mechanism may be used with the grill 100 or other embodiments of the present disclosure. As with previous views, surrounding components are not shown for illustrative purposes. The cleanout mechanism 1020 may be placed below the hopper 202 as with previous embodiments.

The cleanout mechanism 1020 comprises a trough 1004 that surrounds a portion of the auger 106 and auger tube 207 proximate the opening 402 in the auger tube. The trough may have walls that slope downwardly toward a door 1002 below the auger tube 207. In some embodiments, the trough 1004 may have a similar shape as the hopper 202 and functions as an extension to the hopper 202 below the auger tube 207. The trough 1004 may have a similar geometry (on a smaller scale) as the hopper 202 (e.g., an inverted pyramid).

The door 1002 may be placed on a spring hinge as with previous embodiments. A arm 308 may serve to hold the door 1002 in a closed position. The arm 308 may be withdrawn to allow the door 1002 to open, thereby draining fuel pellets from the auger 202 and/or trough 1004. Handle and spring mechanisms may also be provided as with previous embodiments. A chute 1008 may guide the falling fuel pellets into a receptacle (e.g., receptacle 118).

Figure 12:
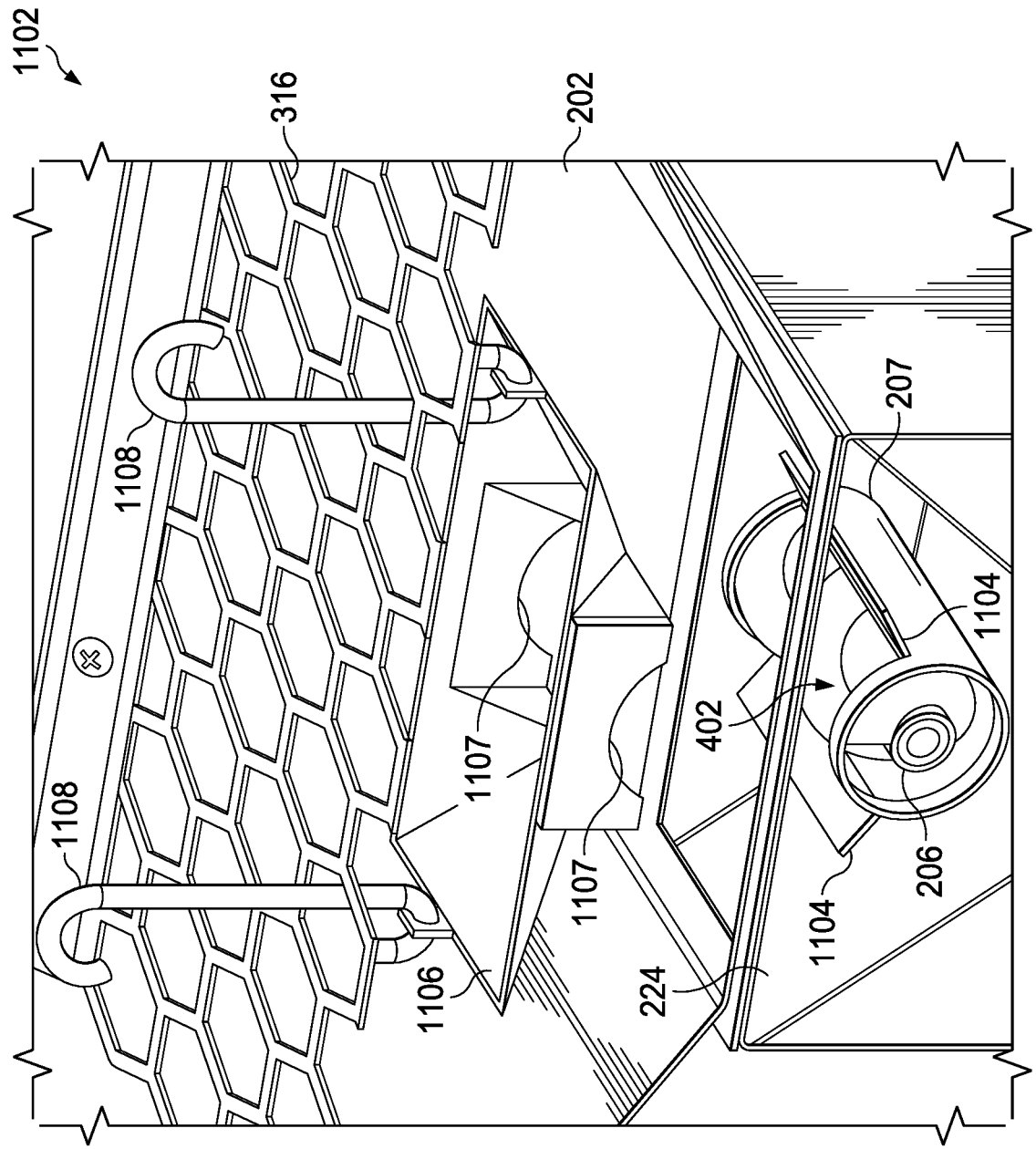
FIG. 12 is a closeup cutaway perspective view of another embodiment of a hopper cleanout mechanism according to aspects of the present disclosure.

Referring now to FIG. 12, a closeup cutaway perspective view of another embodiment of a hopper cleanout mechanism 1102 is shown. The cleanout mechanism 1102 may be provided in place of cleanout mechanisms discussed above. The cleanout mechanism 1102 does not rely on exterior handles or internal doors for operation.

The cleanout mechanism 1102 comprises a guide member 1106 that may be placed to span a distance between the hopper 202 and the opening 402 of the auger tube 207 such that fuel pellets are guided from the hopper to the opening 402 when the guide member is placed in position between the hopper 202 and opening 402. In some embodiments, flaps 1104 may be provided attached to the auger tube 207 near the opening 402 to aid in proper location of the guide member on the auger tube 207 and/or too further guide fuel pellets from above into the opening 402. The guide member 1106 may further provide cutouts 1107 or other components have a cooperative contour with the auger tube 207 and/or any flaps 1104 to provide that fuel pellets are reliably guided into the opening 402 when the cleanout mechanism 1102 is closed or otherwise not in use. The guide member 1106 may comprise a series of planar panels arrange to guide fuel pellets downward and toward the opening 402 (e.g., as shown). The guide member 1106 could also comprise contoured or curved components selected to guide the pellets as required.

To activate the cleanout mechanism 1102 to remove fuel pellets from the hopper 202, the guide member 1106 may be lifted or elevated out or away from its position on or near the auger tube 207. This allows any pellets remaining in the hopper or on the guide member to fall into chute 224 (and into receptacle 118, for example). One or more lift hooks 1108 may be attached to or otherwise engaged with the guide member 1106 such that a user can use the same to lift of elevate the guide member 1106 for draining. In some embodiments, the lift hooks extend upwardly at least to the screen 316 even when the guide member 1106 is in the lowered position such that the user can elevate the guide member 1106 without interference from the screen 316. The lift hooks 1108 may be sized to substantially equal in length a distance from the guide member 1106 to the screen 316 such that the hooks engage the screen 316 when the guide member 1106 is in place near or in contact with the auger tube 207 and/or hopper 202.

Figure 13:
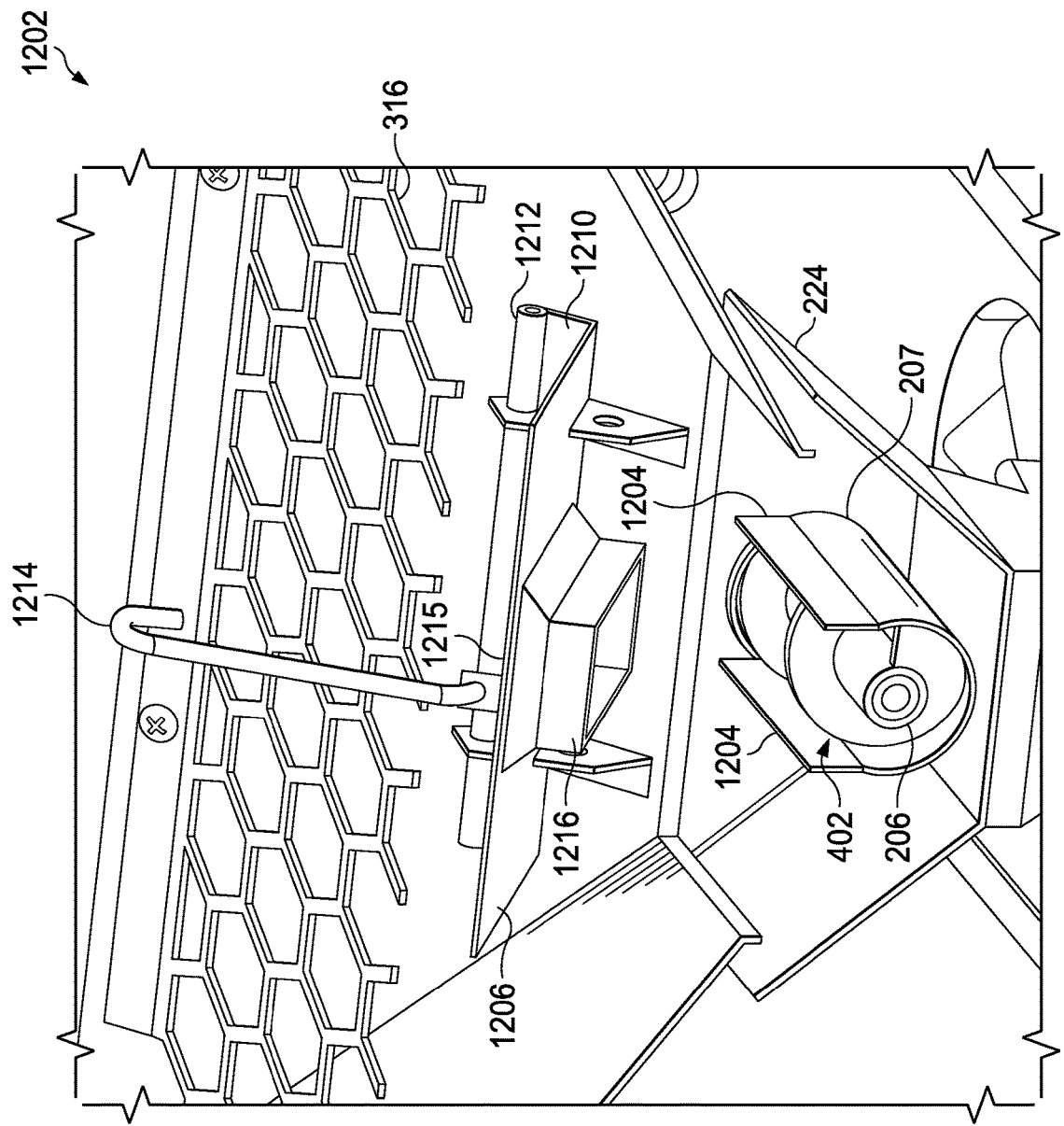
FIG. 13 is a closeup cutaway perspective view of another embodiment of a hopper cleanout mechanism according to aspects of the present disclosure.

Referring now to FIG. 13, a closeup cutaway perspective view of another embodiment of a hopper cleanout mechanism 1202 according to aspects of the present disclosure is shown. The cleanout mechanism 1202 is similar to the cleanout mechanism 1102 in that it does not rely on external actuators to operate. The cleanout mechanism 1202 comprises a cover plate 1206 that moves between an uplifted position where fuel pellets are allowed to fall from the plate 1206 and out of the hopper 202 into chute 224 and a lower position where fuel pellets are blocked from falling through the hopper 202 and into the chute 224. The cover plate 1206 may be hingedly attached to the hopper 202 (as shown), the chute 202, or another location. As shown, a hinge 212 is provided on a wall of the hopper 202. The cover plate has an offset flange 1210 such that the plate 1206 lays in position at the bottom of the hopper 202 to block pellet flow even where the hinge 1212 is somewhat elevated from a bottom of the hopper 202 or from an interface between the hopper 202 and chute 224.

With the plate 1206 in a downward, or folded downward, position to retain pellets in the hopper 202, a hole or opening 1215 that is defined in the plate 1206 may be over or near the opening 402 in the auger tube 207. The opening 1215 therefore allows fuel pellets to flow or fall through the plate 1206 to movement via the auger 206. In some embodiments, to avoid loss of pellets, guide flaps 1204 may be provided on or near the auger tube 207 and angled to guide pellets into the opening 402. Similarly, the plate 1206 may have a guide chute 1216 below the opening 1215 to guide pellets entering the opening 1215 into the opening 402 of the auger tube 207. When the plate 1206 is opened, the guide chute 1216 and/or flaps 1204 have separation enough to drain pellets from the plate into the chute 224.

The plate 1206 may have a lift hook 1214 attached thereto. In some case the lift hook 1214 may attach to the plate 1206 opposite the hinge 1212 and/or flange 1210. The lift hook allows the use to open the plate 1206 and drain the hopper 202. The lift hook may extend upwardly or away from the plate 1206 toward the screen 316 sufficiently to reach the screen 316. The guide hook 1214 may engage with the screen 316 when the plate 1206 is in a lowered position.

It should be understood that the plate 1206 may comprise a single planar component attached to the flange 1210 or may comprise multiple planar components and arranged to drain generally downward toward the opening 1215. In some cases, the plate 1206 may comprise various curved or radiused components that allow fuel pellets to drain into the opening 1215.

Figure 14:
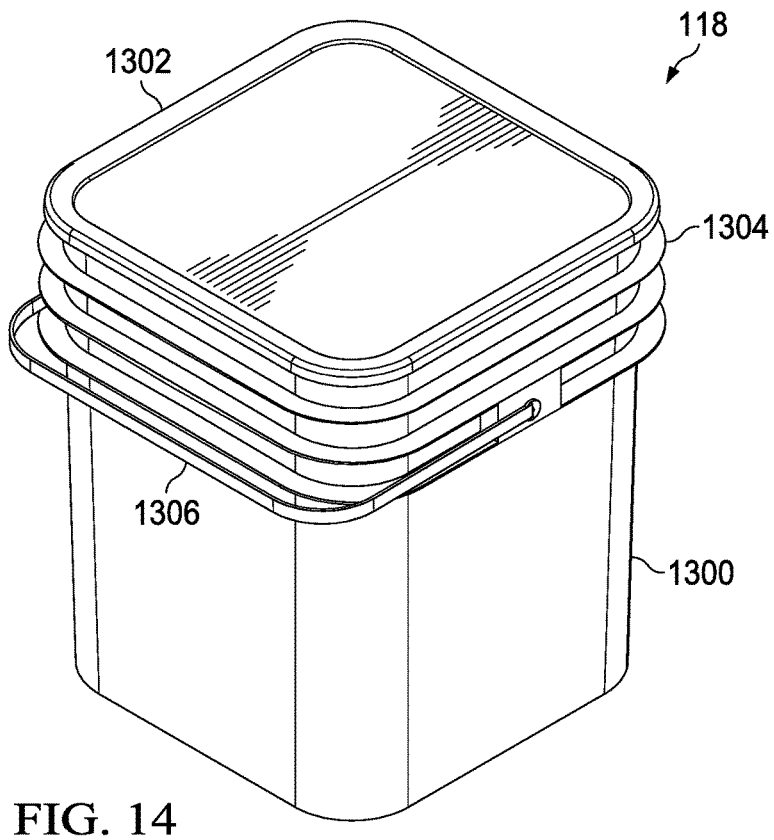
FIG. 14 is a perspective view of a pellet receptacle according to aspects of the present disclosure.
Figure 15:
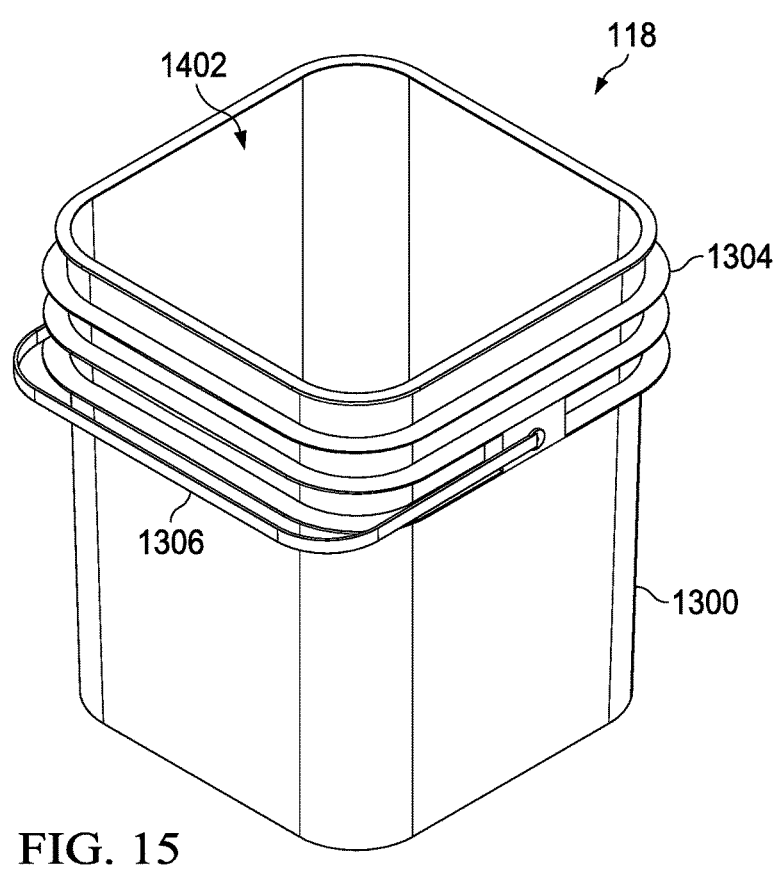
FIG. 15 is another view of the pellet receptacle of FIG. 14 with the lid removed.

Referring now to FIG. 14 is a perspective view of the pellet receptacle 118 according to aspects of the present disclosure is shown. FIG. 15 is another view of the pellet receptacle of FIG. 14 with a lid 1302 removed revealing an interior storage space 1402. The lid 1302 may be used when the receptacle 118 is not in place below the hopper cabinet 110 (see also FIG. 1). The lid 1302 may be selectively placed on the receptacle 118 for fresh keeping of the pellet fuel. In some cases, the receptacle 118 is a receptacle in which pellet fuel can be originally provided to a consumer. It may also be a secondary contain that a user may utilize with grills of the present disclosure, regardless of pellet fuel source. In some cases, a user may have a plurality of receptacles 118 available for catching and/or storing differing kinds of pellet fuels. A user may also utilize the receptacle 118 for capturing drained pellets and then return the pellets to a different container.

In some embodiments, the receptacle 118 comprises a generally rectilinear body 1300 that may be generally square in horizontal cross section (e.g., viewed from above). Near a top of the receptacle 118, may be a number of retaining ridges 1304 may be extend outwardly from the receptacle 118. The ridges may be generally level or horizontal with respect to the body 1300 by having differing distances from the top or bottom of the body 1300. In some cases, the body 1300 and the ridges 1304 may be molded or formed an integrated unit. The body 1300 may comprise a polymer. A handle 1306 may be attached for ease of carry.

As shown in FIGS. 1-2, the receptacle 118 may be selectively or removably attached below the hopper cabinet 110 via the attachment bracket 120. The bracket may comprise a pair of walls 122 spaced apart so as to receive the receptacle body, including the ridges 1304, therebetween. The walls may extend downwardly from the cabinet 110 and have inwardly directed flanges 122 spaced apart from the cabinet 110. The flanges 122 may be spaced apart from one another by a distance sufficient to accommodate the receptable body 1300 but be narrower than an extreme width of the body 1300 excluding the ridges 1304. Thus, one of the ridges 1304 may rest on the flanges 122 such that the receptacle is retain in place under the cabinet 110 so as to receive pellets from the hopper 202 via any of the cleanout or drain mechanism discussed herein.

As can be seen, for example, in FIGS. 2 and 4, the bracket 120 may comprise a rear wall 124 that limits the insertion of the receptacle 118 into the bracket 120. Thus, if the size of the receptacle 118 is chosen properly with respect to the dimensions of the bracket 120, a user may slide the receptacle 118 into the bracket 120 such that the flanges 122 fit below one of the ridges 1304 until the receptable contacts the rear wall 124, with the resultant position of the receptable being such that it receives pellets from the associate cleanout mechanism without spillage.

In some embodiments, it may be desirable that a user be encouraged to insert the receptacle 118 into the bracket 120 such that the handle 1306 is available for use in moving the receptacle. In such case, the receptacle 120 may be constructed with a rectangular cross section (e.g. from the top, or horizontal) such that the receptacle will only fit into the bracket 120 if rotated correctly. The rear wall 124 may be located, in conjunction with the width between flanges 123 or walls 122, and the shape of the receptacle 118, such that the receptacle 118 will not insert fully into the bracket 120 unless the handle 1306 is also facing outward (e.g., away from the rear wall 124). Therefore, a user will have a visual queue that the receptacle 118 is inserted correctly. It should be understood that labels or directions may also be provided.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system comprising:
a hopper that receives fuel pellets and direct the pellets under gravity feed to an auger that moves the pellets into a firepot inside a cooking chamber of a grill;
a door below the auger that has a closed position that retains fuel pellets in the hopper such that the fuel pellets feed to the auger, and that has an opened position to allows the pellets to empty from the hopper and away from the auger;
a closing mechanism that allows a user to selectively open or close the door.

2. The system of claim 1, wherein the door is affixed in place via a hinge in parallel with the auger, and the door spans a distance from the hinge to the auger when the door is in the closed position.

3. The system of claim 2, wherein the door is held in the closed position by an arm in contact with the door, the arm being affixed to a handle that can be pulled by a user to release the door from the closed position.

4. The system of claim 3, wherein the hinge is spring loaded to bias the door toward the open position.

5. The system of claim 4, wherein the arm is biased to a retracted position such that the door is moved to the closed position when the arm is released.

6. The system of claim 1, further comprising a chute below the door that directs fuel pellets from coming through the door in the open position into a receptacle.

7. The system of claim 6, wherein the door is directly above the receptacle and at least a portion of the chute allows the fuel pellets to fall directly into the receptacle.

8. The system of claim 1, further comprising a bracket in a fixed location below the hopper, the bracket having a pair of flanges spaced apart to receive a receptacle having a ridge that rests on the pair of flanges retaining the receptacle.

9. A system comprising:
a cooking grill having a firepot in a cooking chamber thereof;
an auger within an auger tube that moves fuel pellets into the firepot from outside the cooking chamber;
a hopper situated over a portion of the auger and providing fuel pellets to the auger;
a drain chute under the auger that catches fuel pellets not captured by the auger and feeds by gravity into a receptacle;
at least one door having a closed position whereby pellets are prevented from flowing away from the auger and into the drain chute, and an open position whereby the fuel pellets are allowed to flow into the drain chute.

10. The system of claim 9, wherein the door is retained in the closed position by a arm in contact with a bottom of the door.

11. The system of claim 10, wherein the arm extends to a handle that is moveable by a user to displace the arm and allow the door to move to the open position.

12. The system of claim 11, wherein the arm is spring biased to push the door back into the closed position when the handle is released.

13. The system of claim 11, wherein the door is spring biased to open when the arm is displaced to allow the door to move to the open position.

14. The system of claim 9, wherein the door is moved from the closed to the open position by displacing a lift hook extending from the door upwardly into the hopper.

15. The system of claim 14, wherein the door is hinged to the hopper.

16. The system of claim 9:
wherein the auger tube extends below the hopper and defined an upward facing opening over the auger; and
the door has a cooperating contour that engages the auger tube when in the closed position leaving the opening exposed to fuel pellets from the hopper.

17. The system of claim 16, wherein the door extends to the auger tube when in the closed position and is spaced apart from the auger tube when in the open position.

18. The system of claim 9, wherein the auger tube extends below the hopper and defines an upwardly facing opening allowing fuel pellets to be captured by the auger from the hopper.

19. The system of claim 9, wherein the door comprises a pair of doors, with one situated on opposite sides of the auger tube.

20. The system of claim 9, further comprising a bracket in a fixed location below the hopper, the bracket retaining a removeable receptacle in a location such that fuel pellets leaving the drain chute are received in the receptacle.

21. A system comprising:
a hopper feeding fuel pellets to an auger for delivery to a firepot inside a cooking chamber;
a cabinet retaining the hopper and locating a bracket in fixed relationship with respect to the hopper;
a receptacle removable retained by the bracket in a fixed position below the hopper; and
a drain chute below the auger that directs fuel pellets leaving the hopper, but not transported by the auger, into the receptacle;
wherein a gravity flow pathway from the hopper, to the drain chute, and into the receptacle drains substantially all of the fuel pellets from the hopper into the receptacle.

22. The system of claim 21, wherein the bracket comprises a pair of spaced apart downwardly extending walls having a pair of inwardly projecting flanges.

23. The system of claim 22, wherein the receptable comprises a body defining an interior and having a width less than a distance between the inwardly projecting flanges.

24. The system of claim 23, wherein the body provides an outwardly projecting ridge that exceeds the distance between the inwardly projecting flanges but is less than a distance between the spaced apart walls.

25. The system of claim 24, wherein the bracket comprises a rear wall extending downward past the inwardly projecting flanges that arrests insertion of the receptacle into the bracket by contact therewith.

26. A system comprising:
a bracket in a fixed relationship with respect to a hopper drain chute of a pellet grill;
the bracket further comprising a pair of spaced apart downwardly extending walls each having an inwardly projecting flange thereon;
a receptacle defining a substantially rectilinear horizontal cross section and having a width less than a distance between the inwardly projecting flanges;
wherein the receptacle provides an outwardly projecting ridge sized to rest upon the inwardly projecting flanges when the receptacle is placed between the two spaced apart walls.

27. The system of claim 26, further comprising a rear wall affixed to the bracket and located so as to center the receptable with respect to the bracket when the receptacle is inserted against the rear wall.

28. The system of claim 27, further comprising a handle affixed to the receptacle.

29. The system of claim 27, further comprising a removable lid fitting the receptacle.

30. The system of claim 26, wherein the receptacle provides a plurality of outwardly projecting ridges to allow the receptacle to be inserted into the bracket at a plurality of elevations with respect to the drain chute.

* * * * *